United States Patent
Lin et al.

(10) Patent No.: US 10,341,235 B2
(45) Date of Patent: Jul. 2, 2019

(54) LOAD BALANCING IMPLEMENTATION METHOD, DEVICE, AND SYSTEM

(71) Applicant: Huawei Technologies Co., Ltd., Shenzhen (CN)

(72) Inventors: Ke Lin, Shenzhen (CN); Quancai Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 427 days.

(21) Appl. No.: 15/299,667

(22) Filed: Oct. 21, 2016

(65) Prior Publication Data

US 2017/0041234 A1    Feb. 9, 2017

Related U.S. Application Data

(63) Continuation of application No. PCT/CN2014/075802, filed on Apr. 21, 2014.

(51) Int. Cl.
    *H04L 12/721*  (2013.01)
    *H04L 12/741*  (2013.01)
    *H04L 12/803*  (2013.01)

(52) U.S. Cl.
    CPC .......... *H04L 47/125* (2013.01); *H04L 45/70* (2013.01); *H04L 45/745* (2013.01)

(58) Field of Classification Search
    CPC ... H04L 47/12; H04L 12/4633; H04L 43/028; H04L 45/64; H04L 47/11
    See application file for complete search history.

(56) References Cited

U.S. PATENT DOCUMENTS

| | | | |
|---|---|---|---|
| 2014/0140210 A1* | 5/2014 | Liu | H04L 47/12 370/233 |
| 2014/0355615 A1* | 12/2014 | Chang | H04L 45/64 370/392 |

(Continued)

FOREIGN PATENT DOCUMENTS

| | | |
|---|---|---|
| CN | 102594664 A | 7/2012 |
| CN | 103731307 A | 4/2014 |

(Continued)

OTHER PUBLICATIONS

"OpenFlow Switch Specification," Version 1.3.0, (Wire Protocol 0x04), ONF TS-006, Jun. 25, 2012, 106 pages.

(Continued)

*Primary Examiner* — Jung H Park
(74) *Attorney, Agent, or Firm* — Conley Rose, P.C.

(57) ABSTRACT

A load balancing implementation method, device, and system, where the method includes determining, by a switch according to a meter entry of each output port, a write value corresponding to a real-time flow rate of each output port when a flow entry used to forward traffic does not exist, sending the write value to a controller such that the controller creates a forwarding flow entry used to forward the traffic according to the write value, receiving, by the switch, the forwarding flow entry, and forwarding the traffic through the target output port. Therefore, the controller can obtain a rate range of a real-time flow rate of an output port of the switch and allocate a forwarding path according to the obtained rate range of the real-time flow rate, and implement a better load balancing.

19 Claims, 8 Drawing Sheets

(56) References Cited

U.S. PATENT DOCUMENTS

| | | | | |
|---|---|---|---|---|
| 2015/0163146 A1* | 6/2015 | Zhang | ................... | H04L 47/125 |
| | | | | 370/238 |
| 2015/0281085 A1* | 10/2015 | Phaal | ...................... | H04L 47/12 |
| | | | | 370/235 |
| 2016/0065476 A1* | 3/2016 | Reddy | ................. | H04L 43/0888 |
| | | | | 709/224 |
| 2016/0301582 A1* | 10/2016 | Arndt | ...................... | H04L 43/04 |

FOREIGN PATENT DOCUMENTS

| | | |
|---|---|---|
| WO | 2013047705 A1 | 4/2013 |
| WO | 2014057375 A2 | 4/2014 |

OTHER PUBLICATIONS

Foreign Communication From a Counterpart Application, PCT Application No. PCT/CN2014/075802, English Translation of International Search Report dated Jan. 26, 2015, 2 pages.

Foreign Communication From a Counterpart Application, PCT Application No. PCT/CN2014/075802, English Translation of Written Opinion dated Jan. 26, 2015, 8 pages.

\* cited by examiner

LOAD BALANCING IMPLEMENTATION METHOD, DEVICE, AND SYSTEM

CROSS-REFERENCE TO RELATED APPLICATION

This application is a continuation of international patent application number PCT/CN2014/075802 filed on Apr. 21, 2014, which is incorporated by reference.

TECHNICAL FIELD

The present disclosure relates to the field of computer network technologies, and in particular to a load balancing implementation method, device, and system.

BACKGROUND

Software-defined networking (SDN) is a new network architecture, a technology OpenFlow included in the SDN implements flexible control over network traffic by separating a control plane of a network device from a forwarding plane of the network device such that implementation of load balancing becomes much easier. An implementation principle of load balancing is that a controller on the control plane allocates, based on network traffic, different forwarding paths to different data flows and a switch on the forwarding plane processes the data flows according to the forwarding paths received from the controller in order to implement load balancing.

In some approaches, a controller allocates a forwarding path according to a flow rate on a switch. A most frequently used method for collecting statistics about the flow rate is that the controller periodically sends, to the switch, a request message used to query a quantity of flow hits on any path (that is, an output port of the switch), and then obtains a flow rate of the path by calculation according to a result difference between two adjacent queries and a time difference between the two adjacent queries. However, the flow rate obtained by calculation using the statistics collecting method is not a real-time flow rate. As a result, the forwarding path allocated by the controller is inaccurate, and load balancing cannot be implemented well.

SUMMARY

Embodiments of the present disclosure disclose a load balancing implementation method, device, and system in order to resolve a problem in some approaches that a forwarding path allocated by a controller is inaccurate and load balancing cannot be implemented well because an obtained flow rate is not a real-time flow rate.

A first aspect of an embodiment of the present disclosure discloses a load balancing implementation method, including determining, by a switch according to a second flow entry and a meter entry of each output port, a write value corresponding to a real-time flow rate of each output port when a first flow entry used to forward traffic received by the switch does not exist, where the meter entry of each output port includes at least one preset rate value and a write value corresponding to each preset rate value, the second flow entry is corresponding to a service to which the traffic belongs, and the second flow entry includes a command for executing the meter entry of each output port and a command for reporting the traffic to a controller, sending, by the switch, report information of the traffic to the controller, where the report information includes the write value corresponding to the real-time flow rate of each output port such that the controller determines the real-time flow rate of each output port according to the write value and creates a forwarding flow entry used to forward the traffic, where the forwarding flow entry includes an identifier of a target output port used to forward the traffic, receiving, by the switch, the forwarding flow entry sent by the controller, and forwarding, by the switch, the traffic through the target output port corresponding to the identifier in the forwarding flow entry.

With reference to the first aspect, in a first possible implementation manner of the first aspect of the embodiment of the present disclosure, before determining, by the switch according to a second flow entry and a meter entry of each output port, a write value corresponding to a real-time flow rate of each output port, the method further includes receiving, by the switch, the second flow entry and the meter entry of each output port that are sent by the controller.

With reference to the first aspect of the embodiment of the present disclosure or the first possible implementation manner of the first aspect of the embodiment of the present disclosure, in a second possible implementation manner of the first aspect of the embodiment of the present disclosure, the forwarding flow entry further includes identifier information of the service and an identifier of a meter entry corresponding to the target output port.

With reference to the second possible implementation manner of the first aspect of the embodiment of the present disclosure, in a third possible implementation manner of the first aspect of the embodiment of the present disclosure, determining, by the switch according to a second flow entry and a meter entry of each output port, a write value corresponding to a real-time flow rate of each output port includes obtaining, by the switch, the meter entry of each output port according to an identifier that is of the meter entry of each output port and is included in the second flow entry, obtaining, by the switch by querying in the at least one preset rate value in the meter entry of each output port according to the real-time flow rate of each output port, a maximum rate value less than the real-time flow rate, and determining, by the switch, a write value corresponding to each maximum rate value such that the write value is used as the write value corresponding to the real-time flow rate of each output port.

With reference to the first aspect of the embodiment of the present disclosure, in a fourth possible implementation manner of the first aspect of the embodiment of the present disclosure, before determining, by the switch according to a second flow entry and a meter entry of each output port, a write value corresponding to a real-time flow rate of each output port, the method further includes querying, by the switch after receiving the traffic, whether the first flow entry used to forward the traffic exists, where the first flow entry includes an identifier of an output port used to forward the traffic.

With reference to the first aspect of the embodiment of the present disclosure or the first possible implementation manner, the second possible implementation manner, the third possible implementation manner, or the fourth possible implementation manner of the first aspect of the embodiment of the present disclosure, in a fifth possible implementation manner of the first aspect of the embodiment of the present disclosure, the write value in the meter entry of each output port is recorded in a manner of writing metadata.

A second aspect of an embodiment of the present disclosure discloses a load balancing implementation method, including receiving, by a controller, a write value sent by a switch, where the write value is a write value that is determined by the switch according to a second flow entry and a meter entry of each output port and that is corresponding to a real-time flow rate of each output port, the meter entry of each output port includes at least one preset rate value and a write value corresponding to each preset rate value, the second flow entry is corresponding to a service to which traffic received by the switch belongs, and the second flow entry includes a command for executing the meter entry of each output port and a command for reporting the traffic to the controller, determining, by the controller, the real-time flow rate of each output port according to the write value, and creating a forwarding flow entry used to forward the traffic, where the forwarding flow entry includes an identifier of a target output port used to forward the traffic, and sending, by the controller, the forwarding flow entry to the switch such that the switch forwards the traffic through the target output port corresponding to the identifier in the forwarding flow entry.

With reference to the second aspect, in a first possible implementation manner of the second aspect of the embodiment of the present disclosure, before receiving, by a controller, a write value sent by a switch, the method further includes creating, by the controller, the second flow entry and the meter entry of each output port, and sending, by the controller, the second flow entry and the meter entry of each output port to the switch.

With reference to the second aspect of the embodiment of the present disclosure or the first possible implementation manner of the second aspect of the embodiment of the present disclosure, in a second possible implementation manner of the second aspect of the embodiment of the present disclosure, the forwarding flow entry further includes identifier information of the service and an identifier of a meter entry corresponding to the target output port.

A third aspect of an embodiment of the present disclosure discloses a switch, including a determining module configured to determine, according to a second flow entry and a meter entry of each output port, a write value corresponding to a real-time flow rate of each output port when a first flow entry used to forward traffic received by the switch does not exist, where the meter entry of each output port includes at least one preset rate value and a write value corresponding to each preset rate value, the second flow entry is corresponding to a service to which the traffic belongs, and the second flow entry includes a command for executing the meter entry of each output port and a command for reporting the traffic to a controller, a first output module configured to send report information of the traffic to the controller, where the report information includes the write value corresponding to the real-time flow rate of each output port such that the controller determines the real-time flow rate of each output port according to the write value and creates a forwarding flow entry used to forward the traffic, where the forwarding flow entry includes an identifier of a target output port used to forward the traffic, an input module configured to receive the forwarding flow entry sent by the controller, and a second output module configured to forward the traffic through the target output port corresponding to the identifier in the forwarding flow entry.

With reference to the third aspect, in a first possible implementation manner of the third aspect of the embodiment of the present disclosure, the input module is further configured to receive the second flow entry and the meter entry of each output port that are sent by the controller.

With reference to the third aspect of the embodiment of the present disclosure or the first possible implementation manner of the third aspect of the embodiment of the present disclosure, in a second possible implementation manner of the third aspect of the embodiment of the present disclosure, the forwarding flow entry further includes identifier information of the service and an identifier of a meter entry corresponding to the target output port.

With reference to the second possible implementation manner of the third aspect of the embodiment of the present disclosure, in a third possible implementation manner of the third aspect of the embodiment of the present disclosure, the determining module includes an obtaining submodule configured to obtain the meter entry of each output port according to an identifier that is of the meter entry of each output port and is included in the second flow entry, a querying submodule configured to obtain, by querying in the at least one preset rate value in the meter entry of each output port according to the real-time flow rate of each output port, a maximum rate value less than the real-time flow rate, and a determining submodule configured to determine a write value corresponding to each maximum rate value such that the write value is used as the write value corresponding to the real-time flow rate of each output port.

With reference to the third aspect of the embodiment of the present disclosure, in a fourth possible implementation manner of the third aspect of the embodiment of the present disclosure, the switch further includes a querying module configured to query, after the switch receives the traffic, whether the first flow entry used to forward the traffic exists, where the first flow entry includes an identifier of an output port used to forward the traffic.

With reference to the third aspect of the embodiment of the present disclosure or the first possible implementation manner, the second possible implementation manner, the third possible implementation manner, or the fourth possible implementation manner of the third aspect of the embodiment of the present disclosure, in a fifth possible implementation manner of the third aspect of the embodiment of the present disclosure, the write value in the meter entry of each output port is recorded in a manner of writing metadata.

A fourth aspect of an embodiment of the present disclosure discloses a switch, including a memory and a processor, where the memory stores a group of program code, and the processor is configured to invoke the program code stored in the memory to execute the following operations. Determine, according to a second flow entry and a meter entry of each output port, a write value corresponding to a real-time flow rate of each output port when a first flow entry used to forward traffic received by the switch does not exist, where the meter entry of each output port includes at least one preset rate value and a write value corresponding to each preset rate value, the second flow entry is corresponding to a service to which the traffic belongs, and the second flow entry includes a command for executing the meter entry of each output port and a command for reporting the traffic to a controller, send report information of the traffic to the controller, where the report information includes the write value corresponding to the real-time flow rate of each output port such that the controller determines the real-time flow rate of each output port according to the write value and creates a forwarding flow entry used to forward the traffic, where the forwarding flow entry includes an identifier of a target output port used to forward the traffic, receive the forwarding flow entry sent by the controller, and forward the traffic through the target output port corresponding to the identifier in the forwarding flow entry.

With reference to the fourth aspect, in a first possible implementation manner of the fourth aspect of the embodiment of the present disclosure, before the processor determines, according to the second flow entry and the meter entry of each output port, the write value corresponding to the real-time flow rate of each output port, the processor invokes the program code stored in the memory to further execute the operation of receive the second flow entry and the meter entry of each output port that are sent by the controller.

With reference to the fourth aspect of the embodiment of the present disclosure or the first possible implementation manner of the fourth aspect of the embodiment of the present disclosure, in a second possible implementation manner of the fourth aspect of the embodiment of the present disclosure, the forwarding flow entry further includes identifier information of the service and an identifier of a meter entry corresponding to the target output port.

With reference to the second possible implementation manner of the fourth aspect of the embodiment of the present disclosure, in a third possible implementation manner of the fourth aspect of the embodiment of the present disclosure, a manner of determining, by the processor according to the second flow entry and the meter entry of each output port, the write value corresponding to the real-time flow rate of each output port includes obtaining the meter entry of each output port according to an identifier that is of the meter entry of each output port and is included in the second flow entry, obtaining, by querying in the at least one preset rate value in the meter entry of each output port according to the real-time flow rate of each output port, a maximum rate value less than the real-time flow rate, and determining a write value corresponding to each maximum rate value such that the write value is used as the write value corresponding to the real-time flow rate of each output port.

With reference to the fourth aspect of the embodiment of the present disclosure, in a fourth possible implementation manner of the fourth aspect of the embodiment of the present disclosure, before the processor determines, according to the second flow entry and the meter entry of each output port, the write value corresponding to the real-time flow rate of each output port, the processor invokes the program code stored in the memory to further execute the following operation of query, after receiving the traffic, whether the first flow entry used to forward the traffic exists, where the first flow entry includes an identifier of an output port used to forward the traffic.

With reference to the fourth aspect of the embodiment of the present disclosure or the first possible implementation manner, the second possible implementation manner, the third possible implementation manner, or the fourth possible implementation manner of the fourth aspect of the embodiment of the present disclosure, in a fifth possible implementation manner of the fourth aspect of the embodiment of the present disclosure, the write value in the meter entry of each output port is recorded in a manner of writing metadata.

A fifth aspect of an embodiment of the present disclosure discloses a controller, including an input module configured to receive a write value sent by a switch, where the write value is a write value that is determined by the switch according to a second flow entry and a meter entry of each output port and that is corresponding to a real-time flow rate of each output port, the meter entry of each output port includes at least one preset rate value and a write value corresponding to each preset rate value, the second flow entry is corresponding to a service to which traffic received by the switch belongs, and the second flow entry includes a command for executing the meter entry of each output port and a command for reporting the traffic to the controller, a determining module configured to determine the real-time flow rate of each output port according to the write value, a creating module configured to create, according to the real-time flow rate of each output port, a forwarding flow entry used to forward the traffic, where the forwarding flow entry includes an identifier of a target output port used to forward the traffic, and an output module configured to send the forwarding flow entry to the switch such that the switch forwards the traffic through the target output port corresponding to the identifier in the forwarding flow entry.

With reference to the fifth aspect, in a first possible implementation manner of the fifth aspect of the embodiment of the present disclosure, the creating module is further configured to create the second flow entry and the meter entry of each output port, and the output module is further configured to send the second flow entry and the meter entry of each output port to the switch.

With reference to the fifth aspect of the embodiment of the present disclosure or the first possible implementation manner of the fifth aspect of the embodiment of the present disclosure, in a second possible implementation manner of the fifth aspect of the embodiment of the present disclosure, the forwarding flow entry further includes identifier information of the service and an identifier of a meter entry corresponding to the target output port.

A sixth aspect of an embodiment of the present disclosure discloses a controller, including a memory and a processor, where the memory stores a group of program code, and the processor is configured to invoke the program code stored in the memory to execute the following operations. Receive a write value sent by a switch, where the write value is a write value that is determined by the switch according to a second flow entry and a meter entry of each output port and that is corresponding to a real-time flow rate of each output port, the meter entry of each output port includes at least one preset rate value and a write value corresponding to each preset rate value, the second flow entry is corresponding to a service to which traffic received by the switch belongs, and the second flow entry includes a command for executing the meter entry of each output port and a command for reporting the traffic to the controller, determine the real-time flow rate of each output port according to the write value, and create a forwarding flow entry used to forward the traffic, where the forwarding flow entry includes an identifier of a target output port used to forward the traffic, and send the forwarding flow entry to the switch such that the switch forwards the traffic through the target output port corresponding to the identifier in the forwarding flow entry.

With reference to the sixth aspect, in a first possible implementation manner of the sixth aspect of the embodiment of the present disclosure, before the processor receives the write value sent by the switch, the processor invokes the program code stored in the memory to further execute the following operations. Create the second flow entry and the meter entry of each output port, and send the second flow entry and the meter entry of each output port to the switch.

With reference to the sixth aspect of the embodiment of the present disclosure or the first possible implementation manner of the sixth aspect of the embodiment of the present disclosure, in a second possible implementation manner of the sixth aspect of the embodiment of the present disclosure, the forwarding flow entry further includes identifier information of the service and an identifier of a meter entry corresponding to the target output port.

A seventh aspect of an embodiment of the present disclosure discloses a load balancing implementation system, including a switch and a controller, where the switch is configured to determine, according to a second flow entry and a meter entry of each output port, a write value corresponding to a real-time flow rate of each output port when a first flow entry used to forward traffic received by the switch does not exist, where the meter entry of each output port includes at least one preset rate value and a write value corresponding to each preset rate value, the second flow entry is corresponding to a service to which the traffic belongs, and the second flow entry includes a command for executing the meter entry of each output port and a command for reporting the traffic to the controller, send report information of the traffic to the controller, where the report information includes the write value corresponding to the real-time flow rate of each output port, receive a forwarding flow entry sent by the controller, and forward the traffic through a target output port corresponding to an identifier in the forwarding flow entry, and the controller is configured to receive the write value sent by the switch, determine the real-time flow rate of each output port according to the write value, create the forwarding flow entry used to forward the traffic, and send the forwarding flow entry to the switch such that the switch forwards the traffic through the target output port corresponding to the identifier in the forwarding flow entry.

With reference to the seventh aspect, in a first possible implementation manner of the seventh aspect of the embodiment of the present disclosure, the controller is further configured to create the second flow entry and the meter entry of each output port and send the second flow entry and the meter entry of each output port to the switch, and the switch is further configured to receive the second flow entry and the meter entry of each output port that are sent by the controller.

With reference to the seventh aspect of the embodiment of the present disclosure or the first possible implementation manner of the seventh aspect of the embodiment of the present disclosure, in a second possible implementation manner of the seventh aspect of the embodiment of the present disclosure, the forwarding flow entry further includes identifier information of the service and an identifier of a meter entry corresponding to the target output port.

With reference to the second possible implementation manner of the seventh aspect of the embodiment of the present disclosure, in a third possible implementation manner of the seventh aspect of the embodiment of the present disclosure, a manner of determining, by the switch, according to the second flow entry and the meter entry of each output port, the write value corresponding to the real-time flow rate of each output port includes obtaining, by the switch, the meter entry of each output port according to an identifier that is of the meter entry of each output port and is included in the second flow entry, obtaining, by querying in the at least one preset rate value in the meter entry of each output port according to the real-time flow rate of each output port, a maximum rate value less than the real-time flow rate, and determining a write value corresponding to each maximum rate value such that the write value is used as the write value corresponding to the real-time flow rate of each output port.

With reference to the seventh aspect of the embodiment of the present disclosure, in a fourth possible implementation manner of the seventh aspect of the embodiment of the present disclosure, before the switch determines, according to the second flow entry and the meter entry of each output port, the write value corresponding to the real-time flow rate of each output port, the switch is further configured to query, after receiving the traffic, whether the first flow entry used to forward the traffic exists, where the first flow entry includes an identifier of an output port used to forward the traffic.

With reference to the seventh aspect of the embodiment of the present disclosure or the first possible implementation manner, the second possible implementation manner, the third possible implementation manner, or the fourth possible implementation manner of the seventh aspect of the embodiment of the present disclosure, in a fifth possible implementation manner of the seventh aspect of the embodiment of the present disclosure, the write value in the meter entry of each output port is recorded in a manner of writing metadata.

According to the embodiments of the present disclosure, when a first flow entry used to forward traffic received by a switch does not exist, the switch determines, according to a second flow entry and a meter entry of each output port, a write value corresponding to a real-time flow rate of each output port, and sends the write value to a controller such that the controller determines the real-time flow rate of each output port according to the write value and creates a forwarding flow entry used to forward the traffic, and then, the switch receives the forwarding flow entry sent by the controller and forwards the traffic through a target output port corresponding to an identifier in the forwarding flow entry. By implementing the embodiments of the present disclosure, the controller can be enabled to obtain a rate range of a real-time flow rate of an output port of the switch and allocate a forwarding path according to the obtained rate range of the real-time flow rate, thereby implementing better load balancing.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose a load balancing implementation method, device, and system, and a controller can be enabled to obtain a rate range of a real-time flow rate of an output port of a switch and allocate a forwarding path according to the obtained rate range of the real-time flow rate, thereby implementing better load balancing. Details are described in the following separately.

Figure 1:
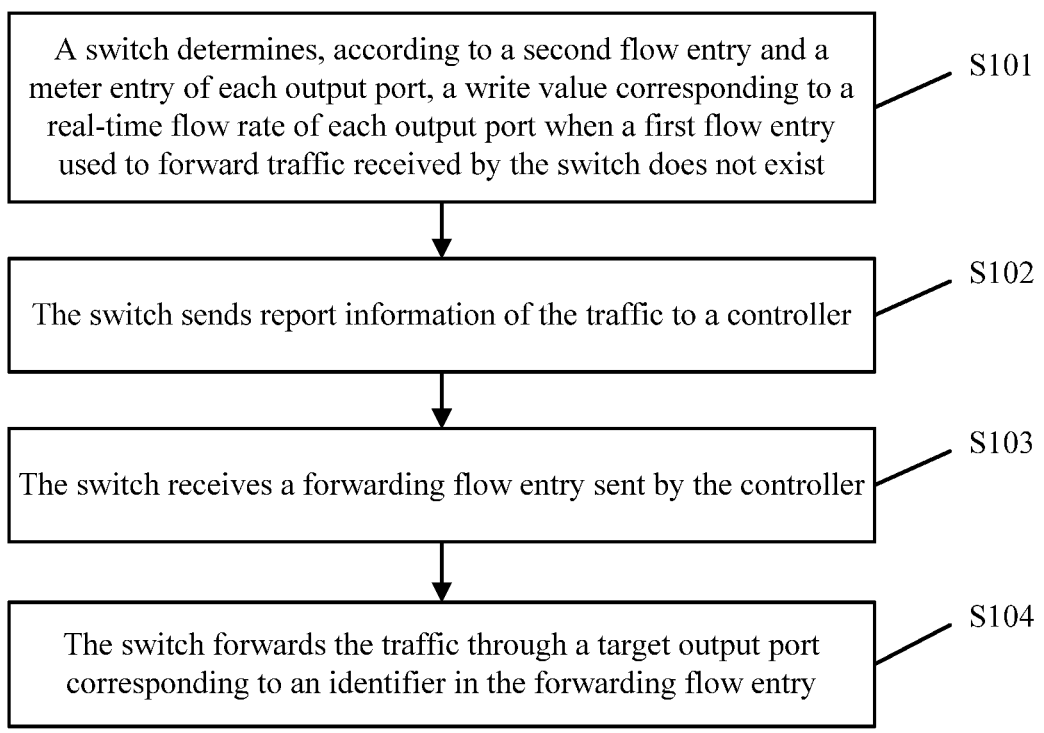
FIG. 1 is a schematic flowchart of a load balancing implementation method according to an embodiment of the present disclosure.

Referring to FIG. 1, FIG. 1 is a schematic flowchart of a load balancing implementation method according to an embodiment of the present disclosure. As shown in FIG. 1, the method may include the following steps.

Step S101: A switch determines, according to a second flow entry and a meter entry of each output port, a write value corresponding to a real-time flow rate of each output port when a first flow entry used to forward traffic received by the switch does not exist.

In this embodiment of the present disclosure, the first flow entry may include an identifier of an output port used to forward the traffic.

In this embodiment of the present disclosure, each output port of the switch has a corresponding meter entry of the output port, and each meter entry may include at least one preset rate value and a write value corresponding to each preset rate value. The second flow entry may include an identifier of the meter entry of each output port, a command for executing the meter entry of each output port, and a command for reporting the traffic to a controller. The second flow entry is corresponding to a service to which the traffic received by the switch belongs.

In this embodiment of the present disclosure, a larger quantity of preset rate values included in a meter entry indicates a more precise rate range of a real-time flow rate obtained by means of analysis by the controller. A range of the write value corresponding to each preset rate value may be 0 to $2^{64}-1$, which is not limited in this embodiment of the present disclosure.

In an optional implementation manner, a manner of determining, by the switch according to the second flow entry and the meter entry of each output port, the write value corresponding to the real-time flow rate of each output port may include obtaining, by the switch, the meter entry of each output port according to the identifier that is of the meter entry of each output port and is included in the second flow entry, obtaining, by the switch by querying in the at least one preset rate value in the meter entry of each output port according to the real-time flow rate of each output port, a maximum rate value less than the real-time flow rate, and determining, by the switch, a write value corresponding to each maximum rate value such that the write value is used as the write value corresponding to the real-time flow rate of each output port.

In an optional implementation manner, the write value in the meter entry of each output port may be recorded in a manner of writing metadata.

Figure 7:
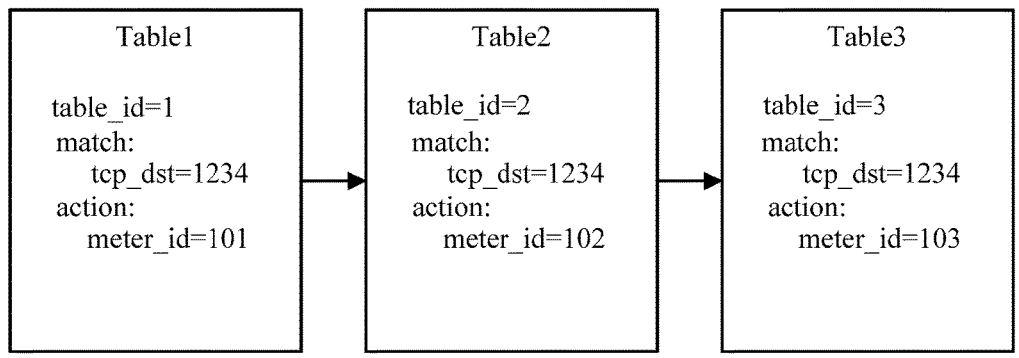
FIG. 7 is a schematic structural diagram of implementing multiple meter entries by flow entry cascading according to an embodiment of the present disclosure.

In this embodiment of the present disclosure, either of the following methods may be used such that after the meter entry of each output port is obtained, the switch successively obtains, by querying in the at least one preset rate value in the meter entry of each output port according to the identifier of the meter entry, the maximum rate value less than the real-time flow rate of each output port. A first method is to implement multiple meter entries by flow entry cascading. As shown in FIG. 7, FIG. 7 is a schematic structural diagram of implementing multiple meter entries by flow entry cascading disclosed in this embodiment of the present disclosure. A second method is to modify the OpenFlow protocol such that the meter entry is used as a special operation.

In this embodiment of the present disclosure, a WRITE_METADATA operation is added to an operation type of a meter in the OpenFlow protocol. By performing the operation, different write_metadata values may be written based on different rate values. The meter to which the WRITE_METADATA operation is added may be shown as follows:

```
enum ofp_meter_band_type{
  OFPMBT_DROP = 1, /*Drop packet. */
  OFPMBT_DSCP_REMARK = 2, /* Remark DSCP in the IP header. */
  OFPMBT_WRITE_METADATA = 3, /*A write operation added for implementing load balancing*/
  OFPMBT_EXPERIMENTER = 0xFFFF /* experimenter meter band. */
}
```

The OFPMBT_WRITE_METADATA is the WRITE_METADATA operation added for implementing load balancing.

Figure 6:
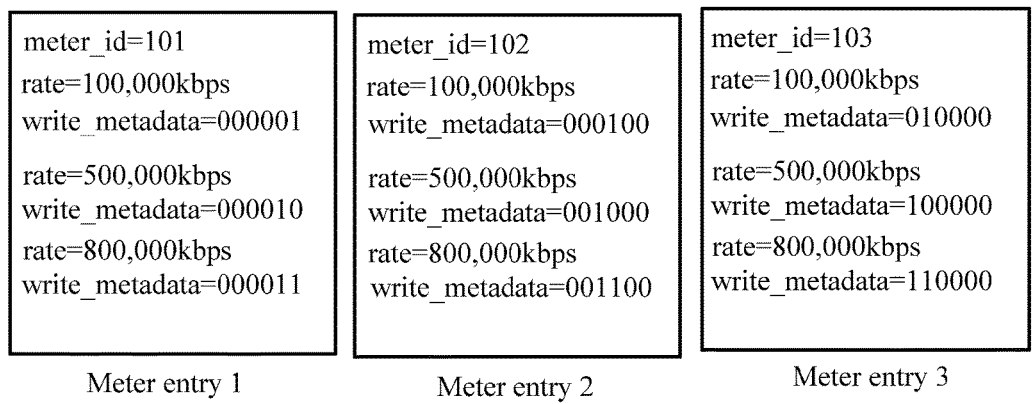
FIG. 6 is a schematic structural diagram of a meter entry according to an embodiment of the present disclosure.
Figure 8:
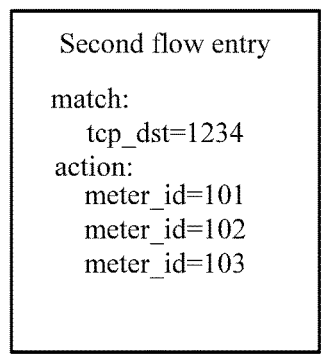
FIG. 8 is a schematic structural diagram of a second flow entry according to an embodiment of the present disclosure.

For example, it is assumed that the switch has three output ports (that is, three forwarding paths), an output port 1, an output port 2, and an output port 3. A meter entry of each output port may be shown in FIG. 6, where FIG. 6 is a schematic structural diagram of a meter entry disclosed in this embodiment of the present disclosure. A meter entry 1, a meter entry 2, and a meter entry 3 in FIG. 6 are meter entries of the output port 1, the output port 2, and the output port 3, respectively. As shown in FIG. 6, each meter entry may include an identifier of the meter entry meter_id (101, 102, or 103), three preset rate values (100,000 kilobits per second (kbps), 500,000 kbps, and 800,000 kbps), and a write value write_metadata corresponding to each preset rate value. Write values corresponding to the three preset rate values in a meter entry in FIG. 6 are different, and write values corresponding to a same preset rate value in different meter entries are also different. For example, the second flow entry in this embodiment of the present disclosure may be shown in FIG. 8, where FIG. 8 is a schematic structural diagram of a second flow entry disclosed in this embodiment of the present disclosure. As shown in FIG. 8, the second flow entry may include a number of a Transmission Control Protocol (TCP) port tcp_dst (1234) of the service and the identifier of the meter entry meter_id (101, 102, or 103) of each output port of the switch.

For example, it is assumed that a number of a TCP port that is of the switch and currently processes a service A is 1234, real-time flow rates that are detected using hardware and of the service A on the three output ports of the switch are respectively 600,000 kbps, 200,000 kbps, and 900,000 kbps, and the meter entry and the second flow entry are shown in FIG. 6 and FIG. 8, respectively. A manner of obtaining, by the switch according to the prestored second flow entry and the prestored meter entry of each output port, the write value corresponding to the real-time flow rate of each output port may include first obtaining, by the switch, the identifier of the meter entry (101, 102, or 103) of each output port from the second flow entry, then finding the meter entry of each output port according to the identifier of the meter entry, obtaining, by querying in the at least one preset rate values in each meter entry, a maximum rate value less than the real-time flow rate of the output port corresponding to the meter entry, where maximum rate values obtained by the switch by querying are respectively 500,000 kbps, 100,000 kbps, and 800,000 kbps, and then obtaining, by the switch, a write value corresponding to each maximum rate value, where write values obtained by the switch are respectively 000010, 000100, and 110000.

Step S102: The switch sends report information of the traffic to a controller.

In this embodiment of the present disclosure, the report information includes the write value that is determined in step S101 and that is corresponding to the real-time flow rate of each output port.

In this embodiment of the present disclosure, the switch may send the report information of the traffic to the controller in a packet_in manner such that the controller determines the real-time flow rate of each output port according to the write value and creates a forwarding flow entry used to forward the traffic, where the forwarding flow entry may include an identifier of a target output port used to forward the traffic.

In an optional implementation manner, the forwarding flow entry may further include identifier information of the service (for example, a number of a TCP port of the service) and an identifier of a meter entry corresponding to the target output port. Optionally, the forwarding flow entry may further include source address information of the service, destination address information of the service, and the like, which is not limited in this embodiment of the present disclosure.

Figures 9, 10:
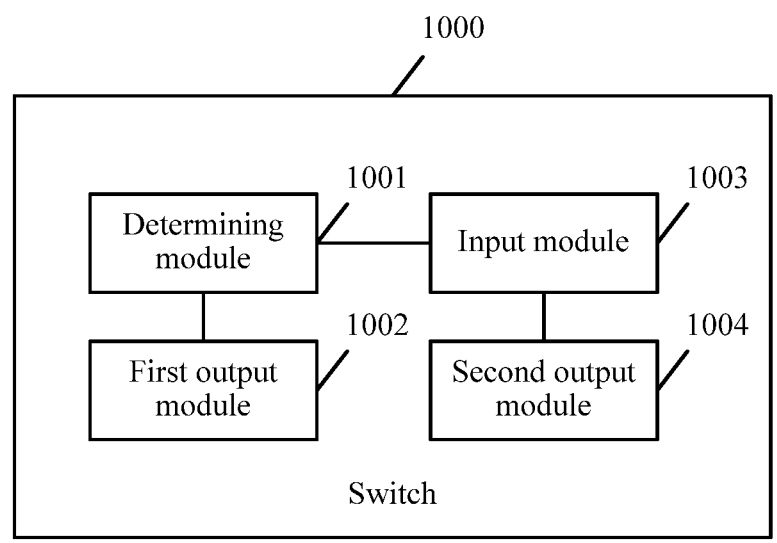
FIG. 9 is a schematic structural diagram of a forwarding flow entry according to an embodiment of the present disclosure.
FIG. 10 is a schematic structural diagram of a switch according to an embodiment of the present disclosure.

For example, the forwarding flow entry in this embodiment of the present disclosure may be shown in FIG. 9, where FIG. 9 is a schematic structural diagram of a forwarding flow entry disclosed in this embodiment of the present disclosure. As shown in FIG. 9, the forwarding flow entry includes the identifier information of the service (for example, the number of the TCP port of the service), the source address information ip_src of the service, the destination address information ip_dst of the service, the identifier of the target output port used to forward the traffic, and the identifier of the meter entry corresponding to the target output port. In this embodiment of the present disclosure, the identifier of the meter entry corresponding to the target output port can enable the forwarding flow entry to perceive a real-time flow rate on the target output port in real time.

In this embodiment of the present disclosure, after receiving the write value, the controller may obtain a rate range of the real-time flow rate of each output port on the switch according to the write value. For example, a rate range of the real-time flow rate of the output port 1 is less than 800,000 kbps and greater than 500,000 kbps, a rate range of the real-time flow rate of the output port 2 is less than 500,000 kbps and greater than 100,000 kbps, and a rate range of the real-time flow rate of the output port 3 is greater than 800,000 kbps. It can be obtained, by means of analysis of the rate ranges of the real-time flow rates of the different output ports, that the output port 2 is the idlest output port among the three output ports. The controller allocates, to the switch, the output port 2 as a forwarding path for forwarding the traffic by the switch, thereby implementing load balancing.

Step S103: The switch receives a forwarding flow entry sent by the controller.

Step S104: The switch forwards the traffic through a target output port corresponding to an identifier in the forwarding flow entry.

According to this embodiment of the present disclosure, when a first flow entry used to forward traffic received by a switch does not exist, the switch determines, according to a second flow entry and a meter entry of each output port, a write value corresponding to a real-time flow rate of each output port, and sends the write value to a controller such that the controller determines the real-time flow rate of each output port according to the write value and creates a forwarding flow entry used to forward the traffic, and then, the switch receives the forwarding flow entry sent by the controller and forwards the traffic through a target output port corresponding to an identifier in the forwarding flow entry. By implementing this embodiment of the present disclosure, the controller can be enabled to obtain a rate range of a real-time flow rate of an output port of the switch and allocate a forwarding path according to the obtained rate range of the real-time flow rate, thereby implementing better load balancing.

Figure 2:
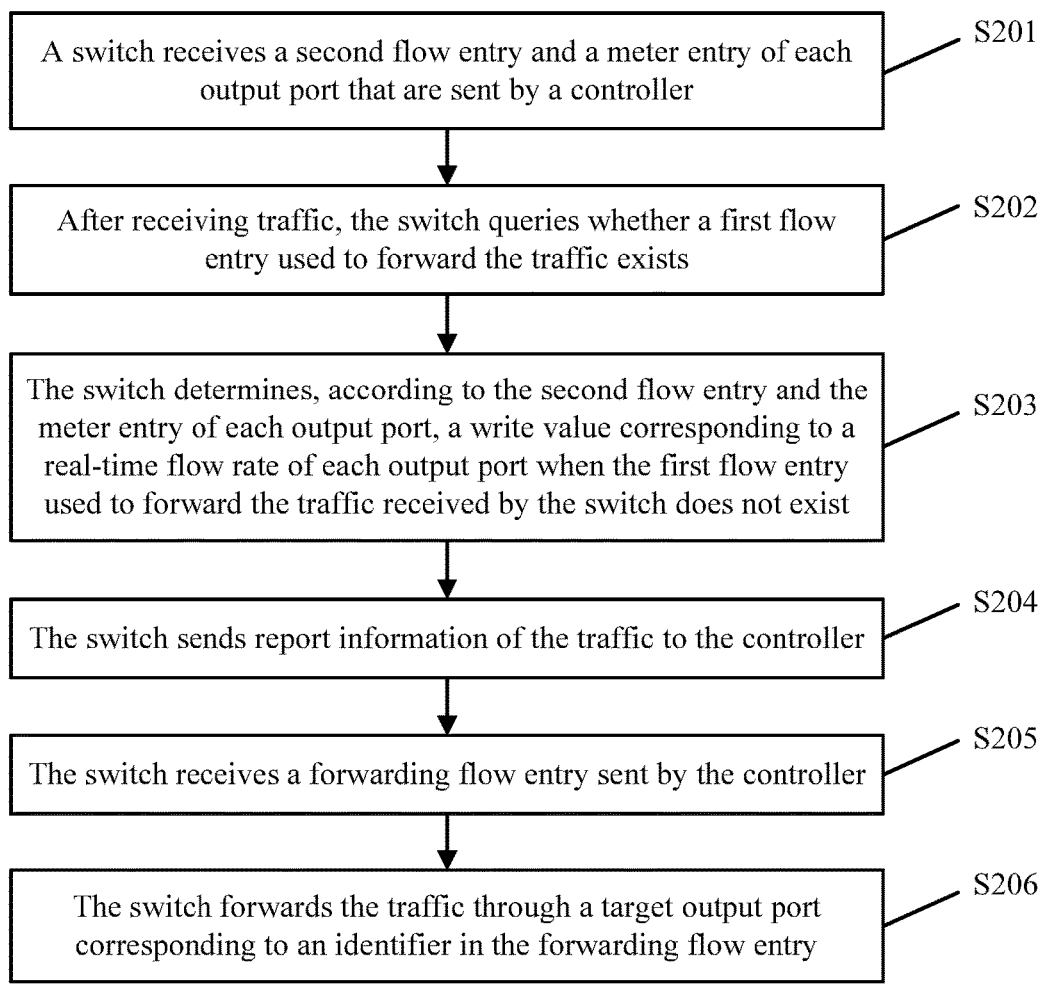
FIG. 2 is a schematic flowchart of another load balancing implementation method according to an embodiment of the present disclosure.

Referring to FIG. 2, FIG. 2 is a schematic flowchart of another load balancing implementation method according to an embodiment of the present disclosure. As shown in FIG. 2, the method may include the following steps.

Step S201: A switch receives a second flow entry and a meter entry of each output port that are sent by a controller.

In this embodiment of the present disclosure, each output port of the switch has a corresponding meter entry of the output port, and each meter entry may include at least one preset rate value and a write value corresponding to each preset rate value. The second flow entry may include an identifier of the meter entry of each output port, a command for executing the meter entry of each output port, and a command for reporting traffic to the controller. The second flow entry is corresponding to a service to which the traffic received by the switch belongs.

In this embodiment of the present disclosure, a larger quantity of preset rate values included in a meter entry indicates a more precise rate range of a real-time flow rate obtained by means of analysis by the controller. A range of the write value corresponding to each preset rate value may be 0 to $2^{64}-1$, which is not limited in this embodiment of the present disclosure.

Step S202: After receiving traffic, the switch queries whether a first flow entry used to forward the traffic exists.

In this embodiment of the present disclosure, the first flow entry may include an identifier of an output port used to forward the traffic.

In this embodiment of the present disclosure, the switch finds the corresponding output port using the identifier of the output port in the first flow entry and forwards the traffic through the output port if a query result in step S202 is that the first flow entry used to forward the traffic exists. If a query result in step S202 is that the first flow entry used to forward the traffic does not exist, step S203 is executed.

Step S203: The switch determines, according to the second flow entry and the meter entry of each output port, a write value corresponding to a real-time flow rate of each output port when the first flow entry used to forward the traffic received by the switch does not exist.

In an optional implementation manner, a manner of determining, by the switch according to the second flow entry and the meter entry of each output port, the write value corresponding to the real-time flow rate of each output port may include obtaining, by the switch, the meter entry of each output port according to the identifier that is of the meter entry of each output port and is included in the second flow entry, obtaining, by the switch by querying in the at least one preset rate value in the meter entry of each output port according to the real-time flow rate of each output port, a maximum rate value less than the real-time flow rate, and determining, by the switch, a write value corresponding to each maximum rate value such that the write value is used as the write value corresponding to the real-time flow rate of each output port.

In an optional implementation manner, the write value in the meter entry of each output port may be recorded in a manner of writing metadata.

Step S204: The switch sends report information of the traffic to the controller.

In this embodiment of the present disclosure, the report information includes the write value that is determined in step S203 and that is corresponding to the real-time flow rate of each output port.

In this embodiment of the present disclosure, the switch may send the report information of the traffic to the controller in a packet_in manner such that the controller determines the real-time flow rate of each output port according to the write value and creates a forwarding flow entry used to forward the traffic, where the forwarding flow entry may include an identifier of a target output port used to forward the traffic.

Step S205: The switch receives a forwarding flow entry sent by the controller.

In an optional implementation manner, the forwarding flow entry may further include identifier information of the service (for example, a number of a TCP port of the service) and an identifier of a meter entry corresponding to the target output port. Optionally, the forwarding flow entry may further include source address information of the service, destination address information of the service, and the like, which is not limited in this embodiment of the present disclosure.

Step S206: The switch forwards the traffic through a target output port corresponding to an identifier in the forwarding flow entry.

By implementing this embodiment of the present disclosure, a controller can be enabled to obtain a rate range of a real-time flow rate of an output port of a switch and allocate a forwarding path according to the obtained rate range of the real-time flow rate, thereby implementing better load balancing.

Figure 3:
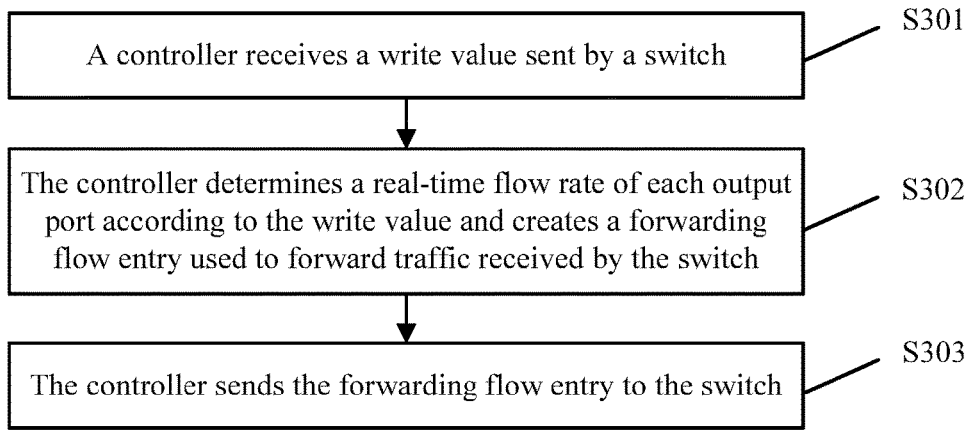
FIG. 3 is a schematic flowchart of still another load balancing implementation method according to an embodiment of the present disclosure.

Referring to FIG. 3, FIG. 3 is a schematic flowchart of still another load balancing implementation method according to an embodiment of the present disclosure. As shown in FIG. 3, the method may include the following steps.

Step S301: A controller receives a write value sent by a switch.

In this embodiment of the present disclosure, the write value is a write value that is determined by the switch according to a second flow entry and a meter entry of each output port and that is corresponding to a real-time flow rate of each output port, where the meter entry of each output port may include at least one preset rate value and a write value corresponding to each preset rate value, the second flow entry may include an identifier of the meter entry of each output port, a command for executing the meter entry of each output port, and a command for reporting traffic to the controller, and the second flow entry is corresponding to a service to which the traffic received by the switch belongs.

In this embodiment of the present disclosure, the write value received by the controller may be included in report information that is of the traffic and that is sent by the switch to the controller.

Step S302: The controller determines a real-time flow rate of each output port according to the write value and creates a forwarding flow entry used to forward traffic received by the switch.

In this embodiment of the present disclosure, the forwarding flow entry may include an identifier of a target output port used to forward the traffic.

In an optional implementation manner, the forwarding flow entry may further include identifier information of the service and an identifier of a meter entry corresponding to the target output port. Optionally, the forwarding flow entry may further include source address information of the service, destination address information of the service, and the like, which is not limited in this embodiment of the present disclosure.

In this embodiment of the present disclosure, after receiving the write value, the controller may obtain a rate range of the real-time flow rate of each output port on the switch according to the write value, and obtain, by means of analysis of rate ranges of real-time flow rates of different output ports, an idlest output port in the output ports of the switch, and the controller allocates, to the switch, the idlest output port as a forwarding path for forwarding the traffic by the switch, thereby implementing load balancing.

Step S303: The controller sends the forwarding flow entry to the switch.

In this embodiment of the present disclosure, the controller sends the forwarding flow entry to the switch such that the switch forwards the traffic through the target output port corresponding to an identifier in the forwarding flow entry.

By implementing this embodiment of the present disclosure, a controller can be enabled to obtain, by means of analysis according to a write value sent by a switch, a rate range of a real-time flow rate of an output port of the switch, obtain, by means of analysis, an idlest output port according to a rate range of a real-time flow rate of each output port, and use the idlest output port as a target output port for forwarding traffic by the switch, thereby implementing better load balancing.

Figure 4:
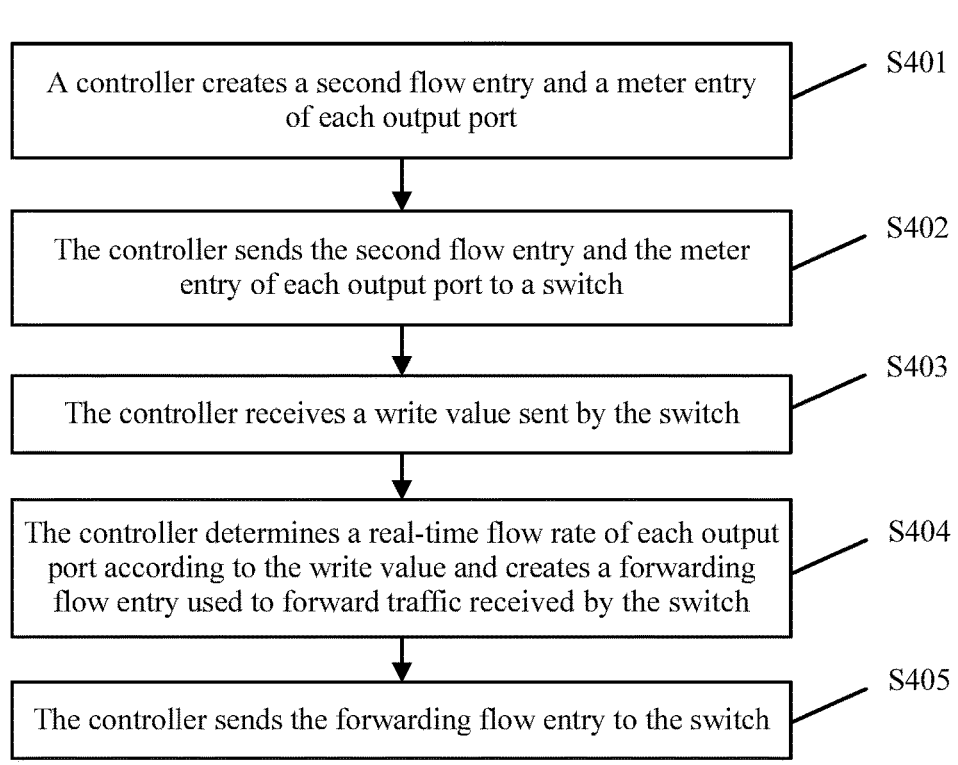
FIG. 4 is a schematic flowchart of yet another load balancing implementation method according to an embodiment of the present disclosure.

Referring to FIG. 4, FIG. 4 is a schematic flowchart of yet another load balancing implementation method according to an embodiment of the present disclosure. As shown in FIG. 4, the method may include the following steps.

Step S401: A controller creates a second flow entry and a meter entry of each output port.

In this embodiment of the present disclosure, the meter entry of each output port may include at least one preset rate value and a write value corresponding to each preset rate value. The second flow entry may include an identifier of the meter entry of each output port, a command for executing the meter entry of each output port, and a command for reporting traffic to the controller. The second flow entry is corresponding to a service to which the traffic received by a switch belongs.

For example, a meter entry created by the controller may be shown in the following Table 1.

TABLE 1

Meter entry created by the controller

| tcp_dst | meter_id | out port | rate (kbps) | write_metadata | mask |
| --- | --- | --- | --- | --- | --- |
| 1234 | 101 | 1 | 100,000 | 000001 | 000011 |
|  |  |  | 500,000 | 000010 | 000011 |
|  |  |  | 800,000 | 000011 | 000011 |
|  | 102 | 2 | 100,000 | 000100 | 001100 |
|  |  |  | 500,000 | 001000 | 001100 |
|  |  |  | 800,000 | 001100 | 001100 |
|  | 103 | 3 | 100,000 | 010000 | 110000 |
|  |  |  | 500,000 | 100000 | 110000 |
|  |  |  | 800,000 | 110000 | 110000 |

The tcp_dst is a number of a TCP port of the service (identifier information of the service). The meter_id is an identifier of a meter entry. The out port is an identifier of an output port of the switch. The rate is a preset rate value. The write_metadata is a write value corresponding to the preset rate value, and the mask is a mask of the write value write_metadata and is used to perform a logical "and" operation with the write value write_metadata. In this way, it can be guaranteed that only a related bit is validly written for each meter entry.

Step S402: The controller sends the second flow entry and the meter entry of each output port to a switch.

In this embodiment of the present disclosure, the controller may send the switch the meter entry of each output port in a form in FIG. 6.

Step S403: The controller receives a write value sent by the switch.

In this embodiment of the present disclosure, the write value is a write value that is determined by the switch according to the second flow entry and the meter entry of each output port and that is corresponding to a real-time flow rate of each output port.

Step S404: The controller determines a real-time flow rate of each output port according to the write value and creates a forwarding flow entry used to forward traffic received by the switch.

In this embodiment of the present disclosure, the forwarding flow entry may include an identifier of a target output port used to forward the traffic.

In an optional implementation manner, the forwarding flow entry may further include identifier information of the service and an identifier of a meter entry corresponding to the target output port. Optionally, the forwarding flow entry may further include source address information of the service, destination address information of the service, and the like, which is not limited in this embodiment of the present disclosure.

In this embodiment of the present disclosure, after receiving the write value, the controller may determine a rate range of the real-time flow rate of each output port on the switch according to the write value, and obtain, by means of analysis of rate ranges of real-time flow rates of different output ports, an idlest output port in the output ports of the switch, and the controller allocates, to the switch, the idlest output port as a forwarding path for forwarding the traffic by the switch, thereby implementing load balancing.

Step S405: The controller sends the forwarding flow entry to the switch.

In this embodiment of the present disclosure, the controller sends the forwarding flow entry to the switch such that the switch forwards the traffic through the target output port corresponding to an identifier in the forwarding flow entry.

By implementing this embodiment of the present disclosure, a controller can be enabled to obtain, by means of analysis according to a write value sent by a switch, a rate range of a real-time flow rate of an output port of the switch, obtain, by means of analysis, an idlest output port according to a rate range of a real-time flow rate of each output port, and use the idlest output port as a target output port for forwarding traffic by the switch, thereby implementing better load balancing.

Figure 5:
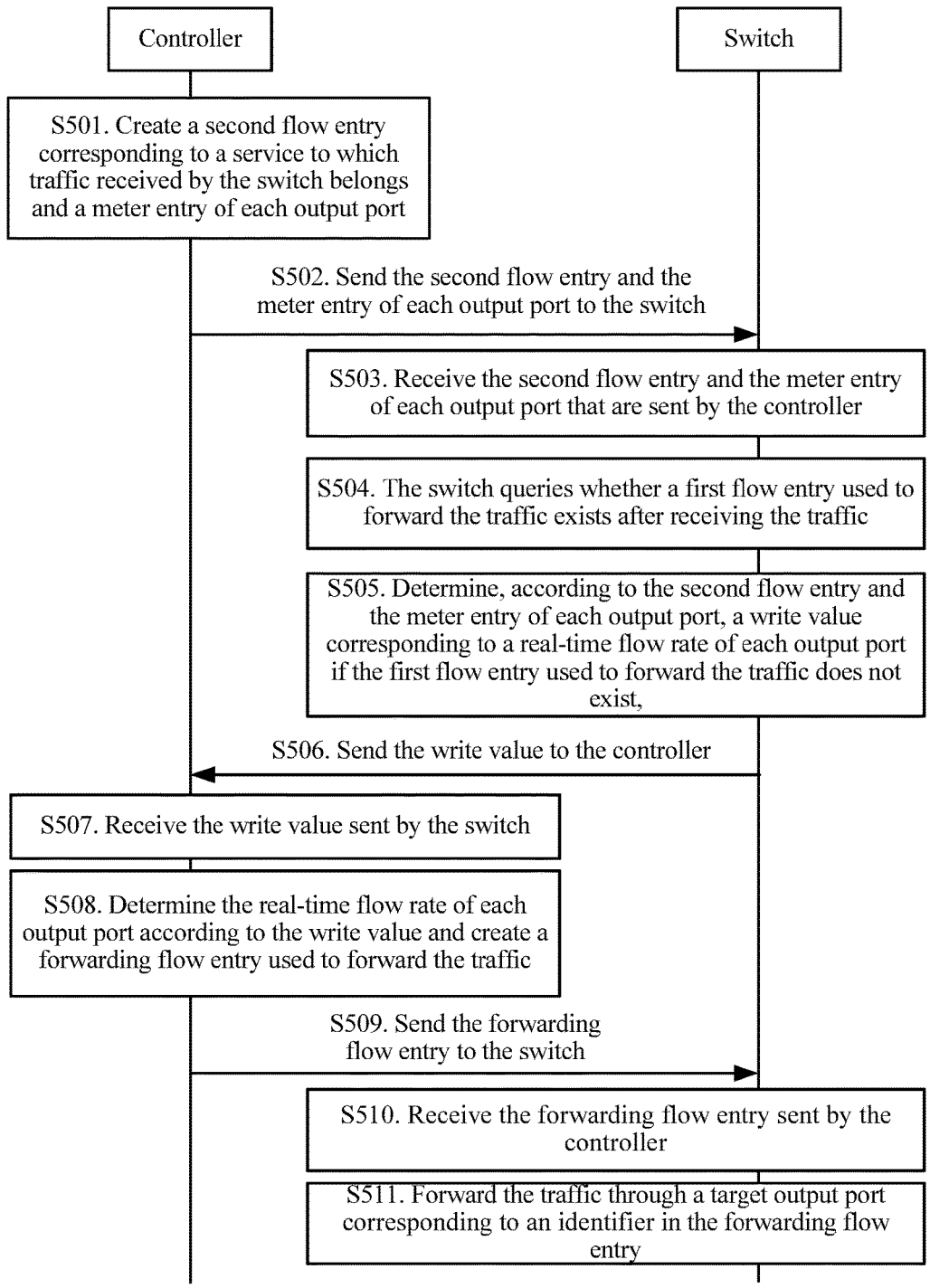
FIG. 5 is a schematic flowchart of still yet another load balancing implementation method according to an embodiment of the present disclosure.

Referring to FIG. 5, FIG. 5 is a schematic flowchart of still yet another load balancing implementation method according to an embodiment of the present disclosure. As shown in FIG. 5, the method may include the following steps.

Step S501: A controller creates a second flow entry corresponding to a service to which traffic received by a switch belongs and a meter entry of each output port.

Step S502: The controller sends the second flow entry and the meter entry of each output port to the switch.

In this embodiment of the present disclosure, the meter entry of each output port may include at least one preset rate value and a write value corresponding to each preset rate value. The second flow entry may include an identifier of the meter entry of each output port, a command for executing the meter entry of each output port, and a command for reporting the traffic to the controller.

In this embodiment of the present disclosure, a larger quantity of preset rate values included in a meter entry indicates a more precise rate range of a real-time flow rate obtained by means of analysis by the controller. A range of the write value corresponding to each preset rate value may be 0 to $2^{64}-1$, which is not limited in this embodiment of the present disclosure.

Step S503: The switch receives the second flow entry and the meter entry of each output port that are sent by the controller.

Step S504: The switch queries whether a first flow entry used to forward the traffic exists after receiving the traffic.

In this embodiment of the present disclosure, the first flow entry may include an identifier of an output port used to forward the traffic.

In this embodiment of the present disclosure, the switch finds the corresponding output port using the identifier of the output port in the first flow entry and forwards the traffic through the output port if a query result in step S504 is that the first flow entry used to forward the traffic exists. If a query result in step S504 is that the first flow entry used to forward the traffic does not exist, step S505 is executed.

Step S505: The switch determines, according to the second flow entry and the meter entry of each output port, a write value corresponding to a real-time flow rate of each output port if the first flow entry used to forward the traffic does not exist.

In an optional implementation manner, a manner of determining, by the switch according to the second flow entry and the meter entry of each output port, the write value corresponding to the real-time flow rate of each output port may include obtaining, by the switch, the meter entry of each output port according to the identifier that is of the meter entry of each output port and is included in the second flow entry, obtaining, by the switch by querying in the at least one preset rate value in the meter entry of each output port according to the real-time flow rate of each output port, a maximum rate value less than the real-time flow rate, and determining, by the switch, a write value corresponding to each maximum rate value such that the write value is used as the write value corresponding to the real-time flow rate of each output port.

In an optional implementation manner, the write value in the meter entry of each output port may be recorded in a manner of writing metadata.

Step S506: The switch sends the write value to the controller.

In this embodiment of the present disclosure, the write value may be included in report information that is of the traffic and that is sent by the switch to the controller.

Step S507: The controller receives the write value sent by the switch.

Step S508: The controller determines the real-time flow rate of each output port according to the write value and creates a forwarding flow entry used to forward the traffic.

In this embodiment of the present disclosure, the forwarding flow entry may include an identifier of a target output port used to forward the traffic.

In an optional implementation manner, the forwarding flow entry may further include identifier information of the service and an identifier of a meter entry corresponding to the target output port. Optionally, the forwarding flow entry may further include source address information of the service, destination address information of the service, and the like, which is not limited in this embodiment of the present disclosure.

In this embodiment of the present disclosure, after receiving the write value, the controller may determine a rate range of the real-time flow rate of each output port on the switch according to the write value, and obtain, by means of analysis of rate ranges of real-time flow rates of different output ports, an idlest output port in the output ports of the switch, and the controller allocates, to the switch, the idlest output port as a forwarding path for forwarding the traffic by the switch, thereby implementing load balancing.

Step S509: The controller sends the forwarding flow entry to the switch.

Step S510: The switch receives the forwarding flow entry sent by the controller.

Step S511: The switch forwards the traffic through a target output port corresponding to the identifier in the forwarding flow entry.

By implementing this embodiment of the present disclosure, a controller can be enabled to obtain a rate range of a real-time flow rate of an output port of a switch and allocate a forwarding path according to the obtained rate range of the real-time flow rate, thereby implementing better load balancing.

Referring to FIG. 10, FIG. 10 is a schematic structural diagram of a switch 1000 according to an embodiment of the present disclosure. As shown in FIG. 10, the switch 1000 may include a determining module 1001, a first output module 1002, an input module 1003, and a second output module 1004.

The determining module 1001 is configured to determine, according to a second flow entry and a meter entry of each output port, a write value corresponding to a real-time flow rate of each output port when a first flow entry used to forward traffic received by the switch 1000 does not exist.

In this embodiment of the present disclosure, each output port of the switch 1000 has a corresponding meter entry of the output port, and each meter entry may include at least one preset rate value and a write value corresponding to each preset rate value. The second flow entry may include an identifier of the meter entry of each output port, a command for executing the meter entry of each output port, and a command for reporting the traffic to a controller. The second flow entry is corresponding to a service to which the traffic received by the switch 1000 belongs.

In this embodiment of the present disclosure, a larger quantity of preset rate values included in a meter entry indicates a more precise rate range of a real-time flow rate obtained by means of analysis by the controller. A range of the write value corresponding to each preset rate value may be 0 to $2^{64}-1$, which is not limited in this embodiment of the present disclosure.

In an optional implementation manner, the determining module 1001 may be further configured to obtain the meter entry of each output port according to the identifier that is of the meter entry of each output port and is included in the second flow entry, obtain, by querying in the at least one preset rate value in the meter entry of each output port according to the real-time flow rate of each output port, a maximum rate value less than the real-time flow rate, and determine a write value corresponding to each maximum rate value such that the write value is used as the write value corresponding to the real-time flow rate of each output port.

In an optional implementation manner, the write value in the meter entry of each output port may be recorded in a manner of writing metadata.

The first output module 1002 is configured to send report information of the traffic to the controller.

In this embodiment of the present disclosure, the report information includes the write value that is determined by the determining module 1001 and that is corresponding to the real-time flow rate of each output port.

In this embodiment of the present disclosure, the first output module 1002 may send the report information of the traffic to the controller in a packet_in manner such that the controller determines the real-time flow rate of each output port according to the write value and creates a forwarding flow entry used to forward the traffic, where the forwarding flow entry may include an identifier of a target output port used to forward the traffic.

In an optional implementation manner, the forwarding flow entry may further include identifier information of the service (for example, a number of a TCP port of the service) and an identifier of a meter entry corresponding to the target output port. Optionally, the forwarding flow entry may further include source address information of the service, destination address information of the service, and the like, which is not limited in this embodiment of the present disclosure.

The input module 1003 is configured to receive the forwarding flow entry sent by the controller.

The second output module 1004 is configured to forward the traffic through the target output port corresponding to the identifier in the forwarding flow entry.

In an optional implementation manner, before the determining module 1001 determines, according to the second flow entry and the meter entry of each output port, the write value corresponding to the real-time flow rate of each output port, the input module 1003 may be further configured to receive the second flow entry corresponding to the service to which the traffic belongs and the meter entry of each output port that are sent by the controller.

By implementing this embodiment of the present disclosure, a controller can be enabled to obtain a rate range of a real-time flow rate of an output port of a switch 1000 and allocate a forwarding path according to the obtained rate range of the real-time flow rate, thereby implementing better load balancing.

Figure 11:
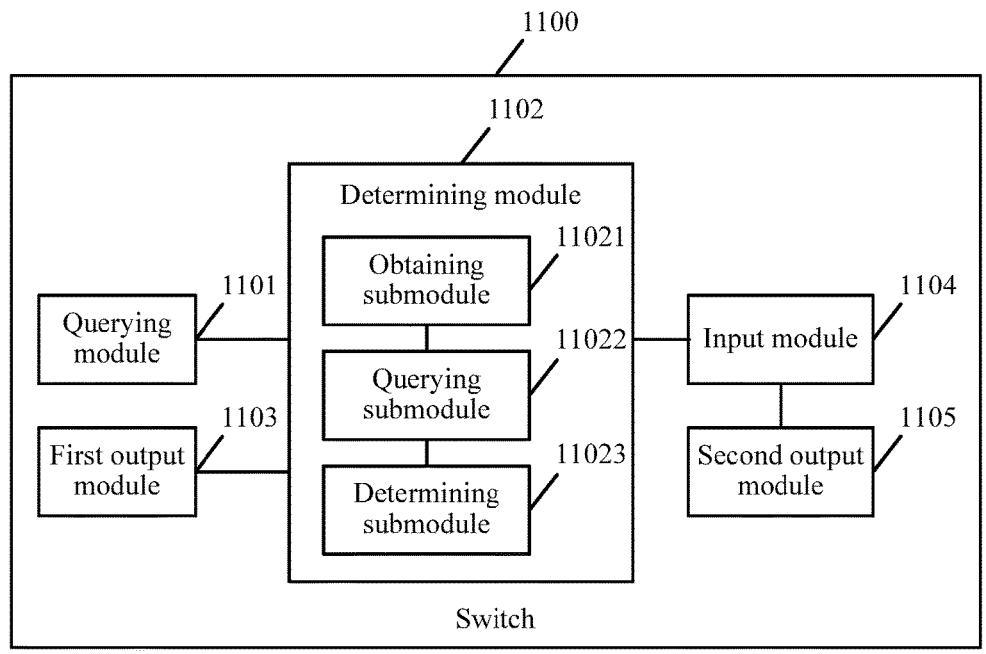
FIG. 11 is a schematic structural diagram of another switch according to an embodiment of the present disclosure.

Referring to FIG. 11, FIG. 11 is a schematic structural diagram of another switch 1100 according to an embodiment of the present disclosure. As shown in FIG. 11, the switch 1100 may include a querying module 1101, a determining module 1102, a first output module 1103, an input module 1104, and a second output module 1105.

The querying module 1101 is configured to query, after the switch 1100 receives traffic, whether a first flow entry used to forward the traffic exists.

In this embodiment of the present disclosure, the first flow entry may include an identifier of an output port used to forward the traffic.

The determining module 1102 is configured to determine, according to a second flow entry and a meter entry of each output port, a write value corresponding to a real-time flow rate of each output port when the querying module 1101 determines, by querying, that the first flow entry used to forward the traffic does not exist.

In this embodiment of the present disclosure, each output port of the switch 1100 has a corresponding meter entry of the output port, and each meter entry may include at least one preset rate value and a write value corresponding to each preset rate value. The second flow entry may include an identifier of the meter entry of each output port, a command for executing the meter entry of each output port, and a command for reporting the traffic to a controller. The second flow entry is corresponding to a service to which the traffic received by the switch 1100 belongs.

In an optional implementation manner, as shown in FIG. 11, the determining module 1102 may include an obtaining submodule 11021, a querying submodule 11022, and a determining submodule 11023.

The obtaining submodule 11021 is configured to obtain the meter entry of each output port according to the identifier that is of the meter entry of each output port and is included in the second flow entry.

The querying submodule 11022 is configured to obtain, by querying in the at least one preset rate value in the meter entry of each output port according to the real-time flow rate of each output port, a maximum rate value less than the real-time flow rate.

The determining submodule 11023 is configured to determine a write value corresponding to each maximum rate value such that the write value is used as the write value corresponding to the real-time flow rate of each output port.

In an optional implementation manner, the write value in the meter entry of each output port may be recorded in a manner of writing metadata.

The first output module 1103 is configured to send report information of the traffic to the controller.

In this embodiment of the present disclosure, the report information includes the write value that is determined by the determining module 1102 and that is corresponding to the real-time flow rate of each output port.

In this embodiment of the present disclosure, the first output module 1103 may send the report information of the traffic to the controller in a packet_in manner such that the controller determines the real-time flow rate of each output port according to the write value and creates a forwarding flow entry used to forward the traffic, where the forwarding flow entry may include an identifier of a target output port used to forward the traffic.

In an optional implementation manner, the forwarding flow entry may further include identifier information of the service (for example, a number of a TCP port of the service) and an identifier of a meter entry corresponding to the target output port. Optionally, the forwarding flow entry may further include source address information of the service, destination address information of the service, and the like, which is not limited in this embodiment of the present disclosure.

The input module 1104 is configured to receive the forwarding flow entry sent by the controller.

The second output module 1105 is configured to forward the traffic through the target output port corresponding to the identifier in the forwarding flow entry.

In an optional implementation manner, before the determining module 1102 determines, according to the second flow entry and the meter entry of each output port, the write value corresponding to the real-time flow rate of each output port, the input module 1104 may be further configured to receive the second flow entry corresponding to the service to which the traffic belongs and the meter entry of each output port that are sent by the controller.

By implementing this embodiment of the present disclosure, a controller can be enabled to obtain a rate range of a real-time flow rate of an output port of a switch 1100 and allocate a forwarding path according to the obtained rate range of the real-time flow rate, thereby implementing better load balancing.

Figure 12:
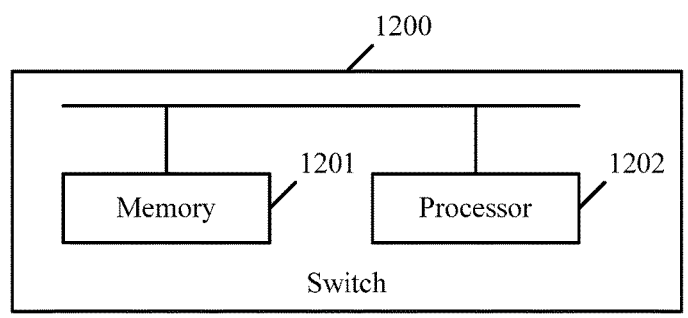
FIG. 12 is a schematic structural diagram of still another switch according to an embodiment of the present disclosure.

Referring to FIG. 12, FIG. 12 is a schematic structural diagram of still another switch 1200 according to an embodiment of the present disclosure. As shown in FIG. 12, the switch 1200 may include a memory 1201 and a processor 1202, where the memory 1201 stores a group of program code, and the processor 1202 is configured to invoke the program code stored in the memory 1201 to execute the following operations. Determine, according to a second flow entry and a meter entry of each output port, a write value corresponding to a real-time flow rate of each output port when a first flow entry used to forward traffic received by the switch 1200 does not exist, where the meter entry of each output port includes at least one preset rate value and a write value corresponding to each preset rate value, the second flow entry is corresponding to a service to which the traffic belongs, and the second flow entry includes a command for executing the meter entry of each output port and a command for reporting the traffic to a controller, send report information of the traffic to the controller, where the report information includes the write value corresponding to the real-time flow rate of each output port such that the controller determines the real-time flow rate of each output port according to the write value and creates a forwarding flow entry used to forward the traffic, where the forwarding flow entry includes an identifier of a target output port used to forward the traffic, receive the forwarding flow entry sent by the controller, and forward the traffic through the target output port corresponding to the identifier in the forwarding flow entry.

In an embodiment, before the processor 1202 determines, according to the second flow entry and the meter entry of each output port, the write value corresponding to the real-time flow rate of each output port, the processor 1202 invokes the program code stored in the memory 1201 to further execute the operation receive the second flow entry and the meter entry of each output port that are sent by the controller.

In an embodiment, the forwarding flow entry further includes identifier information of the service and an identifier of a meter entry corresponding to the target output port. Optionally, the forwarding flow entry may further include source address information of the service, destination address information of the service, and the like, which is not limited in this embodiment of the present disclosure.

In an embodiment, a manner of determining, by the processor 1202 according to the second flow entry and the meter entry of each output port, the write value corresponding to the real-time flow rate of each output port includes obtaining the meter entry of each output port according to an identifier that is of the meter entry of each output port and is included in the second flow entry, obtaining, by querying in the at least one preset rate value in the meter entry of each output port according to the real-time flow rate of each output port, a maximum rate value less than the real-time flow rate, and determining a write value corresponding to each maximum rate value such that the write value is used as the write value corresponding to the real-time flow rate of each output port.

In an embodiment, before the processor 1202 determines, according to the second flow entry and the meter entry of each output port, the write value corresponding to the real-time flow rate of each output port, the processor 1202 invokes the program code stored in the memory 1201 to further execute the operation query, after receiving the traffic, whether the first flow entry used to forward the traffic exists, where the first flow entry includes an identifier of an output port used to forward the traffic.

In an embodiment, the write value in the meter entry of each output port is recorded in a manner of writing metadata.

By implementing this embodiment of the present disclosure, a controller can be enabled to obtain a rate range of a real-time flow rate of an output port of a switch 1200 and allocate a forwarding path according to the obtained rate range of the real-time flow rate, thereby implementing better load balancing.

Figure 13:
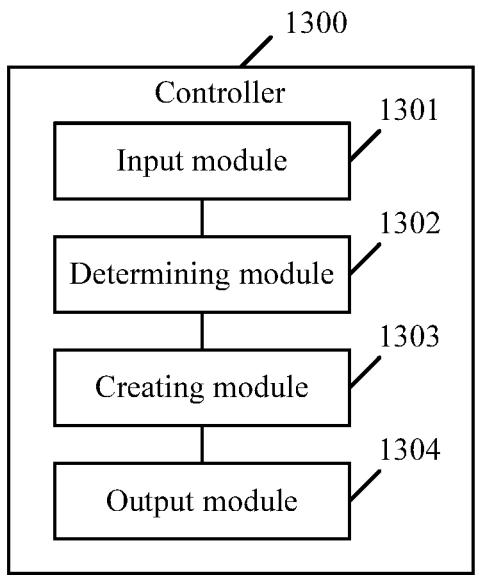
FIG. 13 is a schematic structural diagram of a controller according to an embodiment of the present disclosure.

Referring to FIG. 13, FIG. 13 is a schematic structural diagram of a controller 1300 according to an embodiment of the present disclosure. As shown in FIG. 13, the controller 1300 may include an input module 1301, a determining module 1302, a creating module 1303, and an output module 1304.

The input module 1301 is configured to receive a write value sent by a switch.

In this embodiment of the present disclosure, the write value is a write value that is determined by the switch according to a second flow entry and a meter entry of each output port and that is corresponding to a real-time flow rate of each output port, where the meter entry of each output port may include at least one preset rate value and a write value corresponding to each preset rate value, the second flow entry may include an identifier of the meter entry of each output port, a command for executing the meter entry of each output port, and a command for reporting traffic to the controller 1300, and the second flow entry is corresponding to a service to which the traffic received by the switch belongs.

In this embodiment of the present disclosure, the write value received by the input module 1301 may be included in report information that is of the traffic and that is sent by the switch to the controller 1300.

The determining module 1302 is configured to determine the real-time flow rate of each output port according to the write value.

The creating module 1303 is configured to create, according to the real-time flow rate of each output port, a forwarding flow entry used to forward the traffic received by the switch.

In this embodiment of the present disclosure, the forwarding flow entry may include an identifier of a target output port used to forward the traffic.

In an optional implementation manner, the forwarding flow entry may further include identifier information of the service and an identifier of a meter entry corresponding to the target output port. Optionally, the forwarding flow entry may further include source address information of the service, destination address information of the service, and the like, which is not limited in this embodiment of the present disclosure.

In this embodiment of the present disclosure, after receiving the write value, the controller 1300 may determine a rate range of the real-time flow rate of each output port on the switch according to the write value, and obtain, by means of analysis of rate ranges of real-time flow rates of different output ports, an idlest output port in the output ports of the switch, and the controller 1300 allocates, to the switch, the idlest output port as a forwarding path for forwarding the traffic by the switch, thereby implementing load balancing.

The output module 1304 is configured to send the forwarding flow entry to the switch.

In this embodiment of the present disclosure, the output module 1304 sends the forwarding flow entry to the switch such that the switch forwards the traffic through the target output port corresponding to the identifier in the forwarding flow entry.

In an optional implementation manner, the creating module 1303 is further configured to create the second flow entry corresponding to the service to which the traffic received by the switch belongs and the meter entry of each output port.

The output module 1304 is further configured to send the second flow entry and the meter entry of each output port to the switch.

By implementing this embodiment of the present disclosure, a controller 1300 can be enabled to obtain, by means of analysis according to a write value sent by a switch, a rate range of a real-time flow rate of an output port of the switch, obtain, by means of analysis, an idlest output port according to a rate range of a real-time flow rate of each output port, and use the idlest output port as a target output port for forwarding traffic by the switch, thereby implementing better load balancing.

Figure 14:
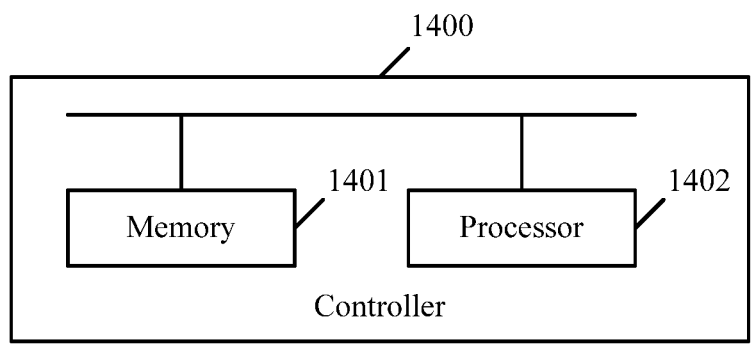
FIG. 14 is a schematic structural diagram of another controller according to an embodiment of the present disclosure.

Referring to FIG. 14, FIG. 14 is a schematic structural diagram of another controller 1400 according to an embodiment of the present disclosure. As shown in FIG. 14, the controller 1400 may include a memory 1401 and a processor 1402, where the memory 1401 stores a group of program code, and the processor 1402 is configured to invoke the program code stored in the memory 1401 to execute the following operations. Receive a write value sent by a switch, where the write value is a write value that is determined by the switch according to a second flow entry and a meter entry of each output port and that is corresponding to a real-time flow rate of each output port, the meter entry of each output port includes at least one preset rate value and a write value corresponding to each preset rate value, the second flow entry is corresponding to a service to which traffic received by the switch belongs, and the second flow entry includes a command for executing the meter entry of each output port and a command for reporting the traffic to the controller 1400, determine the real-time flow rate of each output port according to the write value, and create a forwarding flow entry used to forward the traffic received by the switch, where the forwarding flow entry includes an identifier of a target output port used to forward the traffic, and send the forwarding flow entry to the switch such that the switch forwards the traffic through the target output port corresponding to the identifier in the forwarding flow entry.

In an embodiment, before the processor 1402 receives the write value sent by the switch, the processor 1402 invokes the program code stored in the memory 1401 to further execute the following operations. Create the second flow entry and the meter entry of each output port, and send the second flow entry and the meter entry of each output port to the switch.

In an embodiment, the forwarding flow entry may further include identifier information of the service and an identifier of a meter entry corresponding to the target output port.

By implementing this embodiment of the present disclosure, a controller 1400 can be enabled to obtain, by means of analysis according to a write value sent by a switch, a rate range of a real-time flow rate of an output port of the switch, obtain, by means of analysis, an idlest output port according to a rate range of a real-time flow rate of each output port, and use the idlest output port as a target output port for forwarding traffic by the switch, thereby implementing better load balancing.

Figure 15:
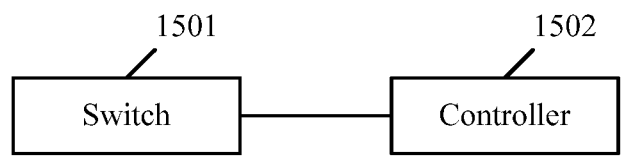
FIG. 15 is a schematic structural diagram of a load balancing implementation system according to an embodiment of the present disclosure.

Referring to FIG. 15, FIG. 15 is a schematic structural diagram of a load balancing implementation system according to an embodiment of the present disclosure. As shown in FIG. 15, the system may include a switch 1501 and a controller 1502.

The switch 1501 is configured to determine, according to a second flow entry and a meter entry of each output port, a write value corresponding to a real-time flow rate of each output port when a first flow entry used to forward traffic received by the switch 1501 does not exist, where the meter entry of each output port includes at least one preset rate value and a write value corresponding to each preset rate value, the second flow entry is corresponding to a service to which the traffic belongs, and the second flow entry includes a command for executing the meter entry of each output port and a command for reporting the traffic to the controller 1502, send report information of the traffic to the controller 1502, where the report information includes the write value corresponding to the real-time flow rate of each output port, receive a forwarding flow entry sent by the controller 1502, and forward the traffic through a target output port corresponding to an identifier in the forwarding flow entry.

The controller 1502 is configured to receive the write value sent by the switch 1501, determine the real-time flow rate of each output port according to the write value, create the forwarding flow entry used to forward the traffic received by the switch 1501, and send the forwarding flow entry to the switch 1501 such that the switch 1501 forwards the traffic through the target output port corresponding to the identifier in the forwarding flow entry.

In an optional implementation manner, the write value in the meter entry of each output port may be recorded in a manner of writing metadata.

In an optional implementation manner, the controller 1502 may be further configured to create the second flow entry corresponding to the service to which the traffic received by the switch 1501 belongs and the meter entry of each output port and send the second flow entry and the meter entry of each output port to the switch 1501.

The switch 1501 may be further configured to receive the second flow entry and the meter entry of each output port that are sent by the controller 1502.

In an optional implementation manner, the forwarding flow entry may further include identifier information of the service and an identifier of a meter entry corresponding to the target output port.

In an optional implementation manner, a manner of determining, by the switch 1501, according to the second flow entry and the meter entry of each output port, the write value corresponding to the real-time flow rate of each output port is further obtaining, by the switch 1501, the meter entry of each output port according to an identifier that is of the meter entry of each output port and is included in the second flow entry, obtaining, by querying in the at least one preset rate value in the meter entry of each output port according to the real-time flow rate of each output port, a maximum rate value less than the real-time flow rate, and determining a write value corresponding to each maximum rate value such that the write value is used as the write value corresponding to the real-time flow rate of each output port.

In an optional implementation manner, before determining, according to the second flow entry and the meter entry of each output port, the write value corresponding to the real-time flow rate of each output port, the switch 1501 may be further configured to query, after receiving the traffic, whether the first flow entry used to forward the traffic exists, where the first flow entry includes an identifier of an output port used to forward the traffic.

By implementing this embodiment of the present disclosure, a controller 1502 can be enabled to obtain a rate range of a real-time flow rate of an output port of a switch 1501 and allocate a forwarding path according to the obtained rate range of the real-time flow rate, thereby implementing better load balancing.

It should be noted that, in the foregoing embodiments, the descriptions of the embodiments have their respective focuses. For a part that is not described in detail in an embodiment, reference may be made to related descriptions in other embodiments. In addition, a person skilled in the art should also understand that all the embodiments described in this specification belong to exemplary embodiments, and the involved actions and modules are not necessarily mandatory to the present disclosure.

Steps in the methods in the embodiments of the present disclosure may be adjusted in sequence, combined, or removed according to an actual requirement.

Modules or submodules in the devices in the embodiments of the present disclosure may be combined, classified, or removed according to an actual requirement.

The first output module, the input module, and the second output module of the switch in the embodiments of the present disclosure may be physical ports on the switch in the embodiments of the present disclosure, and the input module and the output module of the controller in the embodiment of the present disclosure may be physical ports on the controller in the embodiments of the present disclosure, which are not limited in the embodiments of the present disclosure.

The modules or submodules in the embodiments of the present disclosure may be implemented using a universal integrated circuit, for example, a central processing unit (CPU) or using an application specific integrated circuit (ASIC).

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include a magnetic disk, an optical disc, a read-only memory (ROM), a random access memory (RAM), or the like.

The foregoing describes in detail the load balancing implementation method, device, and system that are provided in the embodiments of the present disclosure. In this specification, specific examples are used to describe the principle and implementation manners of the present disclosure, and the description of the embodiments is only intended to help understand the method and core idea of the present disclosure. Meanwhile, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A load balancing method comprising:
   determining, by a switch according to a second flow entry and a meter entry of each output port, a write value corresponding to a real-time flow rate of each output port when a first flow entry used to forward traffic received by the switch does not exist, wherein the meter entry of each output port comprises at least one preset rate value and a write value corresponding to each preset rate value, wherein the second flow entry is corresponding to a service to which the traffic belongs, and wherein the second flow entry comprises a command for executing the meter entry of each output port and a command for reporting the traffic to a controller;
   sending, by the switch, report information of the traffic to the controller, wherein the report information comprises the write value corresponding to the real-time flow rate of each output port;
   receiving, by the switch, a forwarding flow entry sent by the controller, wherein the forwarding flow entry comprises an identifier of a target output port used to forward the traffic and is created by the controller according to the write value corresponding to the real-time flow rate of each output port; and
   forwarding, by the switch, the traffic through the target output port.

2. The method of claim 1, wherein, before determining the write value, the method further comprises receiving, by the switch, the second flow entry and the meter entry of each output port that are sent by the controller.

3. The method of claim 1, wherein determining the write value comprises:
   obtaining, by the switch, the meter entry of each output port according to an identifier that is of the meter entry of each output port and is comprised in the second flow entry;
   obtaining, by the switch by querying in the at least one preset rate value in the meter entry of each output port according to the real-time flow rate of each output port, a maximum rate value less than the real-time flow rate; and
   determining, by the switch, a write value corresponding to each maximum rate value used as the write value corresponding to the real-time flow rate of each output port.

4. The method of claim 1, wherein before determining the write value corresponding to the real-time flow rate of each output port, the method further comprises querying, by the switch after receiving the traffic, whether the first flow entry used to forward the traffic exists, wherein the first flow entry comprises an identifier of an output port used to forward the traffic.

5. The method of claim 1, wherein the write value in the meter entry of each output port is recorded in a manner of writing metadata.

6. A load balancing implementation method comprising:
   receiving, by a controller, a write value sent by a switch, wherein the write value is determined by the switch according to a second flow entry and a meter entry of each output port and is corresponding to a real-time flow rate of each output port, wherein the meter entry of each output port comprises at least one preset rate value and a write value corresponding to each preset rate value, wherein the second flow entry is corresponding to a service to which traffic received by the switch belongs, and wherein the second flow entry comprises a command for executing the meter entry of each output port and a command for reporting the traffic to the controller;
   determining, by the controller, the real-time flow rate of each output port according to the write value sent by the switch;
   creating, by the controller, a forwarding flow entry used to forward the traffic, wherein the forwarding flow entry comprises an identifier of a target output port used to forward the traffic; and
   sending, by the controller, the forwarding flow entry to the switch.

7. The method of claim 6, wherein, before receiving the write value, the method further comprises:
   creating, by the controller, the second flow entry and the meter entry of each output port; and
   sending, by the controller, the second flow entry and the meter entry of each output port to the switch.

8. A switch comprising:
   a memory; and
   a processor coupled to the memory and configured to:
      determine, according to a second flow entry and a meter entry of each output port, a write value corresponding to a real-time flow rate of each output port when a first flow entry used to forward traffic received by the switch does not exist, wherein the meter entry of each output port comprises at least one preset rate value and a write value corresponding to each preset rate value, wherein the second flow entry is corresponding to a service to which the traffic belongs, and wherein the second flow entry comprises a command for executing the meter entry of each output port and a command for reporting the traffic to a controller;
      send report information of the traffic to the controller, wherein the report information comprises the write value corresponding to the real-time flow rate of each output port;
      receive a forwarding flow entry sent by the controller, wherein the forwarding flow entry comprises an identifier of a target output port used to forward the traffic and is created by the controller according to the write value corresponding to the real-time flow rate of each output port; and
      forward the traffic through the target output port.

9. The switch of claim 8, wherein, before determining the write value corresponding to the real-time flow rate of each output port, the processor is further configured to receive the second flow entry and the meter entry of each output port that are sent by the controller.

10. The switch of claim 8, wherein the processor is further configured to:
obtain the meter entry of each output port according to an identifier that is of the meter entry of each output port and is comprised in the second flow entry;
obtain, by querying in the at least one preset rate value in the meter entry of each output port according to the real-time flow rate of each output port, a maximum rate value less than the real-time flow rate; and
determine a write value corresponding to each maximum rate value used as the write value corresponding to the real-time flow rate of each output port.

11. The switch of claim 8, wherein the processor is further configured to query, after receiving the traffic, whether the first flow entry used to forward the traffic exists, wherein the first flow entry comprises an identifier of an output port used to forward the traffic.

12. The switch of claim 8, wherein the write value in the meter entry of each output port is recorded in a manner of writing metadata.

13. A controller comprising:
a memory; and
a processor coupled to the memory and configured to:
receive a write value sent by a switch, wherein the write value is determined by the switch according to a second flow entry and a meter entry of each output port and is corresponding to a real-time flow rate of each output port, wherein the meter entry of each output port comprises at least one preset rate value and a write value corresponding to each preset rate value, wherein the second flow entry is corresponding to a service to which traffic received by the switch belongs, and wherein the second flow entry comprises a command for executing the meter entry of each output port and a command for reporting the traffic to the controller;
determine the real-time flow rate of each output port according to the write value sent by the switch;
create a forwarding flow entry used to forward the traffic, wherein the forwarding flow entry comprises an identifier of a target output port used to forward the traffic; and
send the forwarding flow entry to the switch.

14. The controller of claim 13, wherein the processor is further configured to:
create the second flow entry and the meter entry of each output port; and
send the second flow entry and the meter entry of each output port to the switch.

15. A load balancing implementation system comprising:
a switch configured to:
determine, according to a second flow entry and a meter entry of each output port, a write value corresponding to a real-time flow rate of each output port when a first flow entry used to forward traffic received by the switch does not exist, wherein the meter entry of each output port comprises at least one preset rate value and a write value corresponding to each preset rate value, wherein the second flow entry is corresponding to a service to which the traffic belongs, and wherein the second flow entry comprises a command for executing the meter entry of each output port and a command for reporting the traffic to a controller;
send report information of the traffic to the controller, wherein the report information comprises the write value corresponding to the real-time flow rate of each output port;
receive a forwarding flow entry sent by the controller; and
forward the traffic through a target output port corresponding to an identifier in the forwarding flow entry; and
the controller coupled to the switch and configured to:
receive the write value sent by the switch;
determine the real-time flow rate of each output port according to the write value;
create the forwarding flow entry used to forward the traffic; and
send the forwarding flow entry to the switch.

16. The system of claim 15, wherein the controller is further configured to:
create the second flow entry and the meter entry of each output port; and
send the second flow entry and the meter entry of each output port to the switch.

17. The system of claim 15, wherein the switch is further configured to:
obtain the meter entry of each output port according to an identifier that is of the meter entry of each output port and is comprised in the second flow entry;
obtain, by querying in the at least one preset rate value in the meter entry of each output port according to the real-time flow rate of each output port, a maximum rate value less than the real-time flow rate; and
determine a write value corresponding to each maximum rate value used as the write value corresponding to the real-time flow rate of each output port.

18. The system of claim 15, wherein the switch is further configured to query, after receiving the traffic, whether the first flow entry used to forward the traffic exists, wherein the first flow entry comprises an identifier of an output port used to forward the traffic.

19. The system of claim 15, wherein the write value in the meter entry of each output port is recorded in a manner of writing metadata.

* * * * *